June 28, 1966 G. P. FERRY 3,258,422
PROCESS FOR ELIMINATING ALGAE GROWTH IN COOLING TOWERS
Filed Aug. 19, 1964
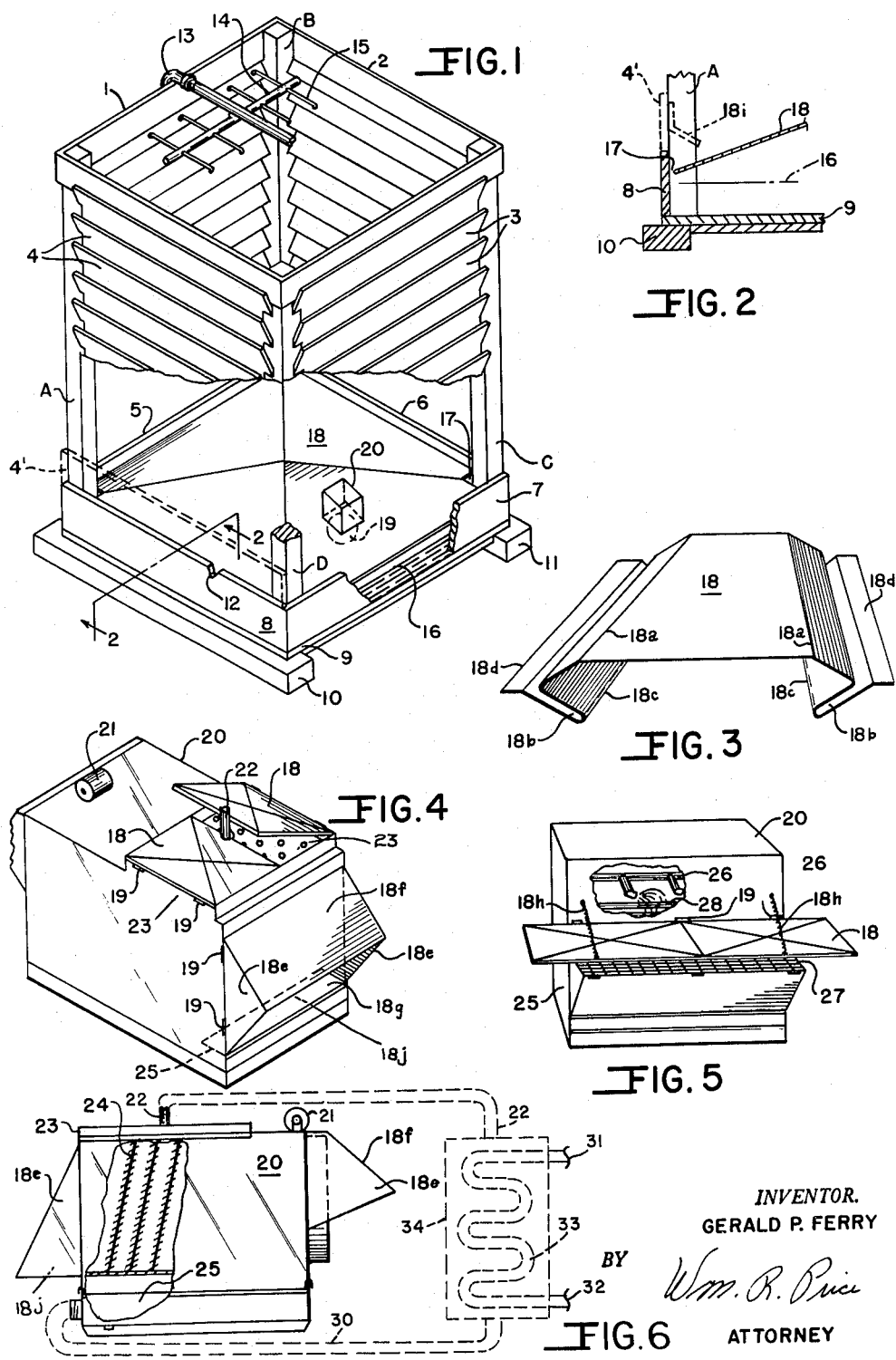
INVENTOR.
GERALD P. FERRY
BY
Wm. R. Price
ATTORNEY

United States Patent Office 3,258,422
Patented June 28, 1966

3,258,422
PROCESS FOR ELIMINATING ALGAE GROWTH
IN COOLING TOWERS
Gerald P. Ferry, 3632 Robin Drive, Louisville, Ky.
Filed Aug. 19, 1964, Ser. No. 390,565
3 Claims. (Cl. 210—64)

This application is a continuation-in-part of my copending application entitled, Apparatus for Treating Water, Serial Number 857,965, filed December 7, 1959, now U.S. Patent No. 3,216,708. This invention relates to treatment of water for controlling biological organisms, particularly algae which thrive on nutrients contained there. The invention relates specifically to control of algae growth in stored water such as, for example, cooling systems and the like.

Water provides an efficient cooling for air conditioning and refrigeration equipment, internal combustion engines and the like, particularly since heat may be readily and economically removed in evaporative cooling towers. One disadvantage to the use of evaporative cooling towers is the tendency for algae to grow in the towers and impair their efficiency with respect to heat exchange. The algae become deposited in hot and cold water basins and are also often drawn into the water jackets and water pipes of cooling systems from the basin which forms the source of supply for the cooling water. The result is that the jackets, circulating pumps, spray nozzles, distribution holes, strainers and water lines become clogged with an accumulation of vegetable matter.

Algae are aquatic plants which may be either microscopic or macroscopic. They are usually visible to the naked eye, although the individual plants may be very small. Thus in ponds and lakes which are stagnant or in which the water is not in very active movement large quantities of these algae will grow, forming a bed on the bottom or sides of the lake or pond, or by rising to the surface, forming the well known green or brown slime thereon. This is particularly noticeable in artificial storage reservoirs, ponds and the like where the algae, particularly the floating variety, cause a great nuisance in that they interfere with the purity of the water and its desirability for other uses.

A great deal of effort has been expended in developing chemical agents to inhibit or destroy slime forming vegetable bodies in water supplies. The various algaecides to be useful, besides being highly effective, must (1) have a low vapor pressure so as not to be lost with the evaporating water, (2) be relatively non-toxic, (3) not permit objectionable vapors from the evaporator. This latter requirement is particularly important where the evaporative towers are in residential areas where odorous or irritating vapors must not be evolved. Various agents have been proposed for this purpose. See, for example, U.S. Patents 2,140,401, 2,221,339, 2,284,889, 2,393,293, and 2,878,155. Chlorine is a good algaecide but is undesirable because of the difficulty of maintaining a suitable concentration of chlorine in waters under the conditions favorable to the growth of algae. Many other materials which are toxic to algae are also highly toxic and harmful to humans, both internally and externally, as in contact with the skin, which makes their use extremely hazardous. Furthermore, heavy use of algaecides tends to form scale on louvers and in water cooled condensers. Algae can be removed from water by filtration, but in removing algae in this manner the filters quickly become clogged, thus increasing filtration cost. In general, filtration is unsatisfactory where the growth is heavy.

It is an object of this invention to prevent the growth of algae in waters which are recirculated and where slime or algae tend to accumulate on the surfaces of the equipment with which the water comes in contact.

Another object of this invention is to provide apparatus for inhibiting algae growth in water basins containing waters having relatively little movement.

A more specific object of this invention is to provide apparatus for inhibiting algae growth in water cooling towers.

Other objects will become apparent from the detailed description of my invention as follows:

I have discovered that algae growth which occurs as, for example, in water cooling towers conventionally used in refrigeration and air conditioning systems may be inhibited by the provisions of a shading or light elimination means over the water basin or reservoir. Without in any way limiting the invention, the shading or light elimination means such as may be utilized in water cooling towers, containing the conventional redwood louvers, may comprise a metal canopy which fits upon supports over the water basin at the bottom of the tower. In the forced draft cooling towers it has been found that algae growth is most prevalent in the hot water distribution basin at the top of the tower and part of cold water basin at the bottom of the tower. Furthermore, it has been noted that various water softening, surface active dispersing agents utilized for their water softening and germicidal properties, apparently promote the growth of algae. This phenomenon is not completely understood, however, it is postulated that the surface active agents contained in the recirculating water supply soften the water to the extent that in running over the louvers of the cooling towers the water picks up small amounts of nutrients which have been deposited thereon from the air, thus supporting the growth of algae in the water basin.

It has been discovered further that certain algae can and do exist in the dark. These algae apparently are capable of transforming from an autotrophic metabolism when exposed to sunlight to a heterotrophic metabolism when placed in the dark. It appears that a critical point is reached some time near 28 days when algae capable of heterotrophic growth live and multiply while those incapable of such an adjustment die. There is evidence that the autotrophic algal metabolism, wherein energy is obtained through photosynthesis, proceeds at a faster rate than that of the heterotrophic algae. However, with less competition, from the autotrophic algae, the heterotrophic algae continue to live and multiply although there appears to be about an eleven-fold decrease in cell size in the heterotrophic algae as compared with the autotrophic algae but an increase in the number of cells.

Notwithstanding the ability of heterotrophic algae to exist and multiply in the total absence of light, I have found that algae growth is eliminated by the practice of my invention since the algae do not get a chance to become established in the absence of light and therefore cannot transform to the heterotrophic state. Secondly, by periodically flushing out the hot and cold water basins, the nutrients necessary for the growth of the heterotrophic algae are removed. These nutrients, it is hypothesized, comprise certain inorganic salts and organic materials such as the dead and decaying bodies of the autotrophic algae. Thus, by preventing growth of the autotrophic algae by elimination of the light and the energy derived therefrom through the process of photosynthesis and by the periodic flushing out of the water basins through monthly or bi-monthly maintenance, it is possible to eliminate algae growth and slime formation in cooling towers and to prevent scale formation by continued use of scale inhibiting agents. It is generally accepted, of course, that slime formation is caused by masses of bacteria, fungi and algae, of single species, mixed species, or in any mixture of the three classes. Slime may exist as a purely biological mass or the organisms may serve as bonding agents to bond together various solid materials such as clay, vegetable fibers, chemical precipitates, scale and the like. In any event, the result is the same with formations of slime deposited upon water cooling towers with resultant lowering of heat exchange capacity and eventual clogging of the lines.

By the use of the apparatus of my invention, algae growth is almost totally inhibited in various water storage basins. The use of surface active dispersing agents such as the substantially insoluble metaphosphates (which are more fully disclosed in U.S. Patents 2,304,850, 2,337,856, and 2,539,305) as, for example, calcium metaphosphate, potassium metaphosphate, sodium metaphosphate (Maddrell salt); the glassy dehydrated phosphates of sodium and calcium, sodium and magnesium and/or calcium and magnesium, dehydrated phosphates of aluminum, zinc and strontium, et cetera, is allowed since the nutrients picked up by the waters are not used to support algae growth. Furthermore, the algae are not available as nutrients for heterotrophic algae, bacteria, fungi and the like.

The invention will be better understood by reference to the attached drawings. Referring now to the drawings:

FIG. 1 is an isometric view of the conventional louvered natural draft cooling tower.

FIG. 2 is a section taken along 2—2 of FIG. 1.

FIG. 3 is a view in perspective of a modification of the shading means utilized in FIG. 1.

FIG. 4 is an isometric view of a forced draft cooling tower.

FIG. 5 is a view from the front of an evaporative condenser.

FIG. 6 is a side elevation of a forced draft cooling tower.

Referring now to FIG. 1, numeral 1 designates one wall of redwood louvers, numeral 2 designates another wall of redwood louvers, numeral 3 designates another wall of redwood louvers and numeral 4 designates the fourth wall of redwood louvers. As illustrated, the louvers are fit into slots of support designated as A, B, C, and D, at a slight angle. I have found, however, that it is often advantageous to nail the bottom louver to the support in order to minimize loss of water through splashing. This is illustrated by numeral 4. The walls of the water basin are indicated by numerals 5, 6, 7 and 8, respectively, and the bottom of the water basin is designated by numeral 9. All of the members are of conventional design and are usually redwood. Numerals 10 and 11 designate supporting members for the cooling tower. Numeral 12 indicates a notched overflow made in side member 8. Numeral 13 designates a pipe returning the water to distribution pipe 14, which in turn supplies the water to spray nozzles designated generally by numeral 15. Numeral 16 indicates the water level in the water basin and numeral 17 designates the free space normally allowed between the canopy 18 and the sides of the water basin 5, 6, 7, and 8. This free space 17 allows for unrestricted flow of water to the basin. The metal canopy as illustrated in FIG. 1 is fabricated of a thin piece of sheet metal bent in two directions by the technique known in duct work as crossbreak. This provides a pyramidal shape which gives strength to the canopy. Numeral 19 designates a float valve normally utilized in cooling towers which has been covered by a metal box designated by numeral 20. It is, of course, necessary to cut a hole in the canopy 18 to allow free space for float valve 19 operation.

As previously indicated, the bottom louver is advantageously nailed to the supporting members which is indicated in FIG. 2 by numeral 4'. In this case, it is sometimes advantageous to provide a piece of sheet metal bent at an angle toward the interior of the tower which is illustrated in FIG. 2 as 18–i. This sheet metal flange reduces loss of water through splashing and also shades the free space designated by numeral 17 around the periphery of the water basin. It is, of course, necessary to provide space 17 or its equivalent to allow for free flow of the water. FIG. 3 shows a modification of the shading means 18 which is fabricated of sheet metal which has been creased along line 18–a, bent inwardly to form trough 18–b and outwardly to form flange 18–d. Apertures all along the bottom of trough 18–b are designated 18–c. In this modification the two extending flanges 18–d fit upon the walls of the water basin to support the shading means, water flows into the trough 18–b (which is well protected from the sun) and then through the apertures 18–c into the basin.

In FIG. 4 the housing of the forced draft cooling towers is indicated generally by numeral 20. The motor for the fan is indicated by numeral 21 and the pipe bringing in the water is indicated by numeral 22. The water distribution pipe is indicated by 22 and the distribution basin is indicated generally by numeral 23. It will be noted that the hot water distribution basin is equipped with several holes of ⅜ to ⅝ inch in diameter. Algae growth has been found to be prevalent around these holes. In this modification, the shading means comprises two flat members 18 with hinges designated by numeral 19 so as to be readily lifted for any service that may be required. The two flat plate members are equipped with semi-circular apertures for admission of pipe 22. The cold water reservoir of the forced draft cooling tower is indicated generally by numeral 25 and the louvers are best shown in FIG. 6, and designated by numeral 24. Leading from cold water basin 25 is pipe 30 which leads to heat exchange zone 34 containing refrigerant coil 33 having inlet 32 and outlet 31. The cold water then absorbs heat from the compressed refrigerant in coil 33 and is then recirculated via hot water pipe 22 to hot water reservoir 23. At each end of the tower a shading structure is provided. The desired modification comprises four parts, 18–e at either side, 18–f at the top and 18–g which is a piece of metal which extends above the exposed portion of the water reservoir 25. The members indicated by 18–e are equipped with hinges designated by numeral 19. It will be noted that the four members define an opening 18–j, through which air may be pulled by the fan.

FIG. 5 is an illustration of a conventional evaporative condenser equipped with sun shade 18, held in place by sun shade supports 18–h. The housing of the condenser is indicated generally by numeral 20, the spray nozzles of the condenser are indicated by numeral 26, the condenser cells are indicated by numeral 28, and the water level of the reservoir is indicated generally by numeral 25. A screen or grid work over the air intake of the evaporative condenser is indicated by numeral 27. The evaporative condenser as shown is of conventional design and contains a fan, a mist eliminator and vents, all of which are not illustrated.

EXAMPLE 1

A test for establishing slime or algae formation was run as follows: Six shallow pans, approximately 8 by 24 inches and 2 inches deep, were filled to a depth of about 1 inch with municipal tap water. About one quarter of a teaspoon of top soil was added to each pan. To pans 1 and 2 a pinch of a pulverized Calgon Algaecide pellet (manufactured and sold by Calgon, Inc., Pittsburgh, Pa.) was added and about a teaspoon of Calgon Micromet Plates. To pans 3 and 4 about a pinch of pulverized Calgon Algaecide pellet was added but without the Calgon Micromet plates. Nothing was added to the water in pans 5 and 6.

Pans 2, 4 and 6 were completely covered with a piece of sheet metal and all the pans were left in the open in the summer heat (ranging from about 80 to 95° F.) for about a month. At the end of this time, the uncovered pans contained a green slimy growth on the bottom and sides. Pan 5 in which the water was untreated had the heaviest growth of algae. Pan 1 containing the Algaecide and Micromet contained an intermediate algae bed and pan 3 containing only the pulverized Algaecide pellet had only a tinge of algae. Pans 2, 4, and 6, when uncovered, were crystal clear with no evidence of algae growth.

EXAMPLE 2

In a full scale commercial test a fifty-ton forced draft air conditioning tower was used which was heavily infested with algae in the distribution basin and in the sump or water basin. Water for this tower was obtained from the Ohio River instead of from the municipal water supply and the algae growth appeared brown with some green, rather than green.

To combat this condition, the slime was scooped out and the tower hosed out. The bags of Micromet plates were removed from the water distribution basin and the sump Algaecide pellets were increased from 2 pellets per 50 gallons to about 4 pellets per 50 gallons of water in the system. Although this treatment appeared to alleviate the condition, within about two weeks the tower was again infested with algae. Permission was granted to install shading means over the hot water distribution basin, over the water basin or sump and at the air inlet (as illustrated in FIGS. 4 and 6). The tower was again cleaned out and the shading means installed. Two weeks later the water in the tower was crystal clear and there was no evidence of algae growth. Micromet bags were installed in the water distribution basin 23, and the water basin or sump 25, and there was no evidence of algae growth or slime formation after a month's operation when the tower was drained and flushed out with a hose to remove dirt as part of the regular monthly maintenance.

EXAMPLE 3

Eight wide-mouth, one-gallon jars were selected for use as chambers to contain the algal cultures. Two and one-half liters of tap water were placed in each chamber. The tops of all the chambers were covered with glass plates to prevent contamination and to reduce evaporation. Six of these eight chambers were each inoculated with 100 milliliters of a mixed algal culture. The algal inoculant was obtained from a growth of algae in a 20-gallon aquarium which initially had been filled with raw Ohio River water. The dominant alga present in the inoculant was *Pithophora oedogonia*. The two uninoculated chambers were used as controls. Four chambers were covered with light-proof shields, one of them being the unexposed control. The four remaining chambers were exposed to sunlight, one of which was the exposed control. All chambers were placed out of doors and thus subjected to the daily variations of the external environment. Algal growth in the cultures was determined numerically by algal cell counts and gravimetrically by ash-free dry weight.

One-liter samples were collected at the initiation and termination of the experiment for the determination of algal cell density. These samples were concentrated to 20 milliliters in a Foerst continuous centrifuge. The algal cell density was determined by examining 20 random fields at 100× magnification in a one-milliliter Sedgwick-Rafter counting chamber. A binocular compound microscope equipped with a Whipple ocular micrometer was used for the enumeration of algal cells and an inverted plankton miscroscope for taxonomic identification.

The first samples for gravimetric analysis were collected at the beginning of the experiment. The second samples were taken 14 days later and the third samples on the 28th day. From the 28th day until the termination of the experiment, samples were taken at regular seven-day intervals.

Gravimetric determinations were made by evaporating 20-milliliter samples from duplicate cultures and each control at 80 degrees C. for 24 hours. Each sample was weighed on a Sartorius rapid selector analytical balance and then ashed at 600 degrees C. for 30 minutes and reweighed later. The resulting ash free dry weights were expressed in milligrams of organic matter per liter.

Twenty-one different algae were found to be present in the inoculant. Three of these were blue-green algae, 12 were green algae and five were diatoms. Of the 11 algae persisting in the exposed culture, three were blue-green algae, seven were green algae and one was a diatom. Six of the original 21 algae present in the inoculant were found to be capable of heterotrophic growth in the dark. Of these six algae, five were green and one was a diatom.

*Table 1.—Organic production as determined by ash-free dry weight analysis. Values represent averages of duplicate samples from cultures and single samples from controls and are expressed in milligrams of organic matter per liter*

| Days | Light Exposed Culture | Unexposed Culture | Light Exposed Control | Unexposed Control |
|---|---|---|---|---|
| 0 | 78 | 76 | 1 | 3 |
| 7 | | | | |
| 14 | 119 | 110 | 2 | 1 |
| 21 | | | | |
| 28 | 185 | 191 | 3 | 3 |
| 35 | 234 | 140 | 14 | 4 |

The algae that grew in the dark were unicellular forms except the two species of Scenedesmus. The total number of algal cells per milliliter increased from 176 in the inoculant to 7,448 in the unexposed culture. Although the number of algal cells per milliliter increased greatly in the unexposed culture during the experiment, the average algal cell size became much reduced. The average cell size of the dark-adapted algae was eight microns as compared with an average cell size of 90 microns for the algae in the inoculant.

*Achnanthes minutissima* showed by far the greatest increase in the number of cells per milliliter of any of the dark-adapted algae. This alga increased from a negligible number in the inoculant to 6,996 cells per milliliter at the termination of the experiment. *Achnanthes minutissima* accounted for 93.9 percent of the 7,448 algal cells per milliliter present in the unexposed culture at the termination of the experiment.

It will be noted that algae growth occurred in the control after the 28th day and by the 35th day was proceeding at an accelerated rate in the control exposed to the light. Further, it will be noted that the organic production in both the exposed and unexposed cultures was proceeding which indicates that algae do exist and multiply in the absence of light, however, by removing nutrients in the hot and cold water basins through monthly or bi-monthly flushing of said hot and cold water basins and by totally eliminating light from these basins, I have been able to totally eliminate algae growth in water cooling towers without the use of chemical algaecides.

It will be appreciated that other designs of canopies for the natural draft cooling towers can be utilized as well as other designs of the awning-type structures utilized over the ends of the forced-type towers. It will be appreciated that the shading means may be adjusted to compensate for the direction and angle of the sun's rays according to the location of the tower.

It is obvious that many modifications can be made which should not depart from the spirit and scope of the invention, except as to be commensurate with the scope of the appended claims.

I claim:
1. In a process of cooling, wherein water is used as a heat exchange medium, including the steps of:
 (a) circulating water in a heat exchange zone wherein water absorbs heat through indirect heat exchange,
 (b) contacting the heated water with a current of air wherein the water is cooled through partial vaporization, and (c) collecting the water in a collection zone for recirculation to a heat exchange zone, the improvement of preventing algae growth and slime formation in said water which comprises the steps of:

(1) recirculating water from said collection zone to said heat exchange zone,
(2) completely eliminating rays of light from contact with the water in the collection zone, and
(3) periodically flushing out said collection zone to remove nutrients for algae and other slime producing organisms.

2. In a process of cooling, wherein water is used as a heat exchange medium, including the steps of:

(a) circulating water in a heat exchange zone wherein water absorbs heat through indirect heat exchange,
(b) contacting the heated water with a current of air wherein the water is cooled through partial vaporization, and
(c) collecting the water in a collection zone for recirculation to a heat exchange zone, the improvement of preventing algae growth and slime formation in said water which comprises the steps of:

(1) recirculating water from said collection zone to said heat exchange zone,
(2) treating the water with a water softening agent containing metallic salts of phosphoric acid to inhibit precipitation of inorganic salts,
(3) completely eliminating rays of light from contact with the water in the collection zone, and
(4) periodically flushing out said collection zone to remove nutrients for algae and other slime producing organisms.

3. In a process of cooling, wherein water is used as a heat exchange medium, including the steps of:

(a) circulating water in a heat exchange zone wherein water absorbs heat through indirect heat exchange,
(b) collecting the heated water in a hot water collection zone,
(c) contacting the heated water with a current of air wherein the water is cooled through partial vaporization, and
(d) collecting the water in a cold water collection zone for recirculation to a heat exchange zone, the improvement of preventing algae growth and slime formation in said water which comprises the steps of:

(1) recirculating water from said cold water collection zone to said heat exchange zone, thence to said hot water collection zone, contacting said hot water with a current of air and collecting said water in said cold water collection zone for recirculation,
(2) completely eliminating rays of light from contact with the water in the hot and cold water collection zones,
(3) periodically flushing out said hot and cold water collection zones to eliminate nutrients therefrom and to prevent the heterotrophic growth of algae therein.

References Cited by the Examiner

UNITED STATES PATENTS

| | | |
|---|---|---|
| 753,573 | 3/1904 | Hettinger. |
| 2,221,339 | 11/1940 | Allison. |
| 2,405,276 | 8/1946 | Taylor _____ 210—57 |
| 2,539,305 | 1/1951 | Hatch _____ 210—57 |
| 2,709,522 | 5/1955 | Osborne. |

OTHER REFERENCES

Betz Handbook of Industrial Water Conditioning, 5th Edition, Betz Laboratories, Inc., Philadelphia 24, Pennsylvania, 1957; pages 178 and 192 relied on.

The Condensed Chemical Dictionary, 4th Edition, Reinhold Publishing Corp., New York 18, New York; copyright 1950, pages 590 and 701 relied on.

HARRY B. THORNTON, *Primary Examiner.*

RONALD R. WEAVER, *Examiner.*